(12) United States Patent
Um

(10) Patent No.: US 9,940,862 B2
(45) Date of Patent: Apr. 10, 2018

(54) FLEXIBLE DISPLAY

(71) Applicant: Samsung Display Co., Ltd., Yongin, Gyeonggi-do (KR)

(72) Inventor: Minho Um, Cheonan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 127 days.

(21) Appl. No.: 14/699,768

(22) Filed: Apr. 29, 2015

(65) Prior Publication Data

US 2016/0180757 A1 Jun. 23, 2016

(30) Foreign Application Priority Data

Dec. 18, 2014 (KR) ........................ 10-2014-0183241

(51) Int. Cl.
  *G06F 3/038* (2013.01)
  *G09G 3/14* (2006.01)
  *G06F 1/16* (2006.01)

(52) U.S. Cl.
  CPC ............. *G09G 3/14* (2013.01); *G06F 1/1641* (2013.01); *G06F 1/1652* (2013.01); *G09G 2300/04* (2013.01); *G09G 2360/04* (2013.01)

(58) Field of Classification Search
  CPC .......... G09G 3/14; G09G 3/16; G09G 3/1641; G09G 2360/04
  See application file for complete search history.

(56) References Cited

U.S. PATENT DOCUMENTS

| | | | | |
|---|---|---|---|---|
| 2010/0064244 A1* | 3/2010 | Kilpatrick, II | ........ | G06F 1/1616 715/773 |
| 2011/0148797 A1* | 6/2011 | Huitema | ............... | G06F 1/1615 345/173 |
| 2011/0227822 A1* | 9/2011 | Shai | ....................... | G06F 1/1615 345/156 |
| 2011/0241998 A1* | 10/2011 | McKinney | ............ | G06F 1/1616 345/168 |
| 2012/0194448 A1* | 8/2012 | Rothkopf | ............. | A45C 13/002 345/173 |
| 2012/0314399 A1 | 12/2012 | Bohn et al. | | |
| 2013/0342090 A1 | 12/2013 | Ahn et al. | | |
| 2014/0126121 A1 | 5/2014 | Griffin et al. | | |

FOREIGN PATENT DOCUMENTS

| | | |
|---|---|---|
| KR | 10-2008-0057909 A | 6/2008 |
| WO | WO 2013/076710 A2 | 5/2013 |

* cited by examiner

*Primary Examiner* — Towfiq Elahi
(74) *Attorney, Agent, or Firm* — Knobbe Martens Olson & Bear LLP

(57) ABSTRACT

A flexible display is disclosed. In one aspect, the flexible display includes a flexible display panel, a main support supporting a first area of the flexible display panel and first and second sub-supports respectively supporting second and third areas of the flexible display panel. The second and third areas are adjacent to the first area. The flexible display further includes first and second hinges respectively connecting the main support to the first and second sub-supports. The flexible display panel is configured to be arranged in first to third configurations respectively exposing different areas of the flexible display panel.

14 Claims, 7 Drawing Sheets

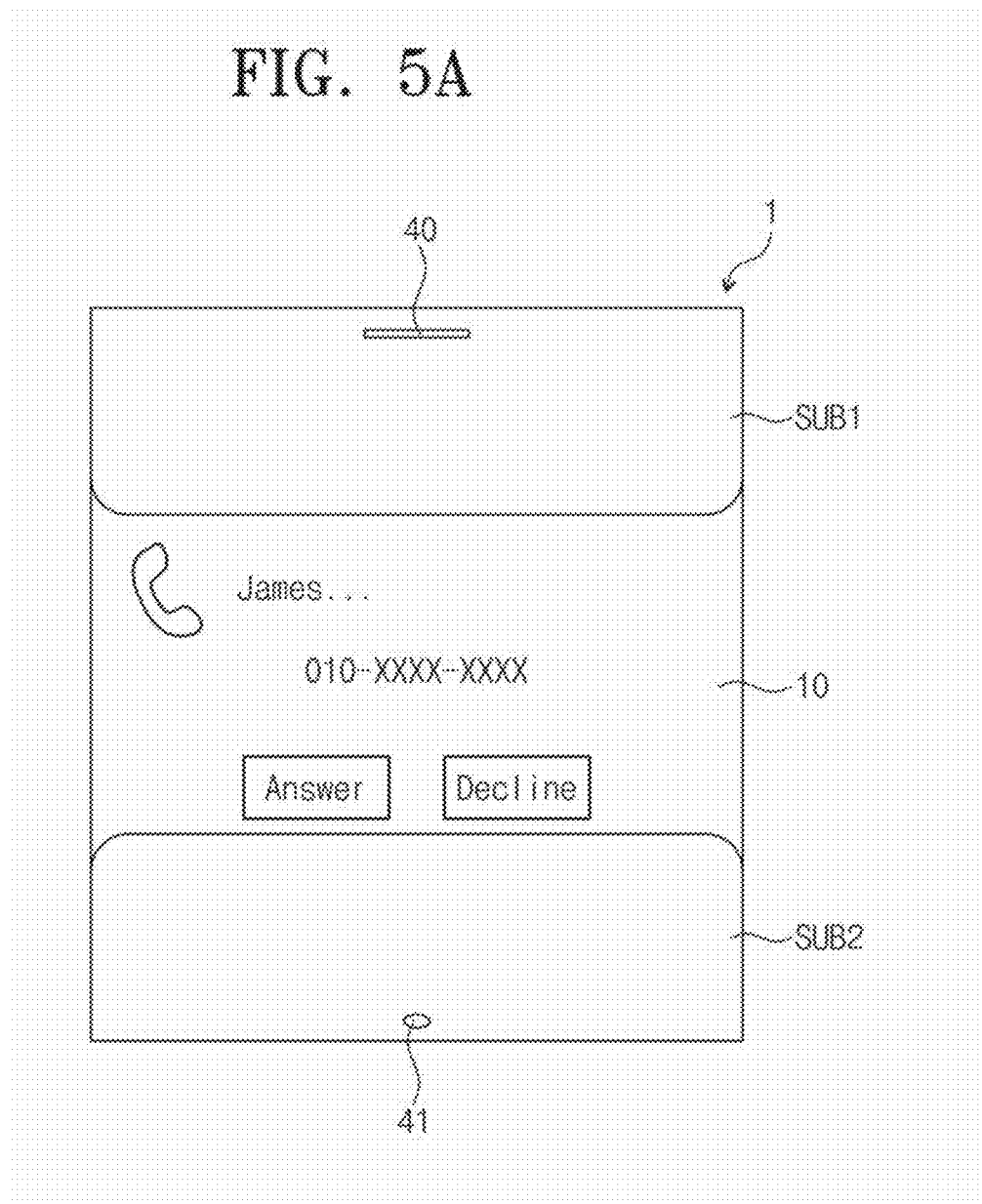

FLEXIBLE DISPLAY

INCORPORATION BY REFERENCE TO ANY PRIORITY APPLICATIONS

This U.S. non-provisional patent application claims priority under 35 U.S.C. of Korean Patent Application No. 10-2014-0183241, filed on Dec. 18, 2014, the entire contents of which are hereby incorporated by reference.

BACKGROUND

Field

The described technology generally relates to a flexible display.

Description of the Related Technology

Ongoing research is being directed to flexible displays which are expandable to be used for varying purposes. Flexible displays can be altered such that their configuration, size, and length are changed by external forces while being able to display images in the various configurations.

When the physical features of a flexible display are changed by applying external forces thereto, it is more vulnerable to being damaged. Accordingly, there is a need for a structure that protects the flexible display from damage when its configuration is changed, e.g., from folded to expanded.

SUMMARY OF CERTAIN INVENTIVE ASPECTS

One inventive aspect is a support structure of a flexible display which supports the flexible display so that the flexible display is not damaged and guides deformation of the flexible display.

Another aspect is a flexible display including: a flexible display panel; a main support supporting a first area of the flexible display panel; first and second sub-supports respectively supporting second and third areas of the flexible display panel, which adjacent the first area; and hinge parts respectively connecting the main support to the first and second sub-supports, wherein the flexible display panel has first to third configurations depending on whether the first and second sub-supports are folded to or unfolded from the main support with respect to the hinge parts, wherein the first configuration includes a configuration in which the first and second sub-supports are unfolded from the main support to expose the first to third areas to the environment, the second configuration includes a configuration in which the first or second sub-support is folded to the main support to expose a portion of the first area and the second or third area to the environment, and the third configuration includes a configuration in which the first and second sub-supports are folded to the main support to expose a portion of the first area to the environment.

In some embodiments, the first area may have an area that is greater than that of each of the second and third areas.

In other embodiments, the second configuration may include: a configuration in which the first sub-support is folded to the main support to expose a first partial area of the first area and the third area to the outside; or a configuration in which the second sub-support is folded to the main support to expose a second partial area of the first area and the second area to the environment.

In still other embodiments, the first and second partial areas may share a third partial area.

In even other embodiments, the third configuration may include a configuration in which the third partial area of the first area is exposed to the environment.

In yet other embodiments, the flexible display may further include a sensing unit sensing the configuration of the flexible display panel; and a display control unit detecting the configuration of the flexible display panel by using the sensing unit to control activation of each area of the flexible display panel according to the detected configuration of the flexible display panel.

In further embodiments, the sensing unit may include at least one of a pressure sensor, an illumination sensor, a proximity sensor, an acceleration sensor, an angular velocity sensor, a gyro sensor, a strain gauge sensor, and a gravity sensor.

In still further embodiments, the display control unit may activate the area exposed to the environment according to the configuration of the flexible display panel.

In even further embodiments, the display control unit may activate the first partial area and the third area when the second configuration in which the first sub-support is folded is detected and the second partial area and the second area when the second configuration in which the second sub-support is folded is detected.

In yet further embodiments, the display control unit may activate the first to third areas when the first configuration is detected and the third partial area when the third configuration is detected.

In much further embodiments, the flexible display may further include a power supply unit supplying a power to the flexible display panel.

In still much further embodiments, the power supply unit may be arranged on the first or second sub-support.

In even much further embodiments, the main support may include a printed circuit board.

In yet much further embodiments, the flexible display may further include: a voice input unit for receiving a voice; and a voice output unit for outputting a voice.

In much still further embodiments, the voice output unit may be arranged on the first sub-support, and the voice input unit is arranged on the second sub-support.

Another aspect is a flexible display including a flexible display panel; a main support supporting a first area of the flexible display panel; a sub-support supporting a second area of the flexible display panel, which is adjacent to the first area; a transparent cover covering a portion of the first area to expose the portion to the outside; and hinge parts connecting the main support to the sub-support, wherein the flexible display panel has first and second configurations depending on whether the sub-support is folded to or unfolded from the main support with respect to the hinge parts, wherein the first configuration comprises a configuration in which the sub-support is unfolded from the main support to expose the first and second areas to the outside, and the second configuration comprises a configuration in which the sub-support is folded to the main support to expose only a portion of the first area to the outside.

Another aspect is a flexible display comprising a flexible display panel; a main support supporting a first area of the flexible display panel; first and second sub-supports respectively supporting second and third areas of the flexible display panel, wherein the second and third areas are adjacent to the first area; and first and second hinges respectively connecting the main support to the first and second sub-supports, wherein the flexible display panel is configured to be arranged in first to third configurations, wherein the first configuration is a configuration in which the first and second sub-supports are unfolded from the main support so as to expose the first to third areas, wherein the second configuration is a configuration in which one of the first or second sub-support is folded to the main support so as to expose a portion of the first area and one of the second or third areas, and wherein the third configuration is a configuration in which the first and second sub-supports are folded to the main support so as to expose a portion of the first area.

In exemplary embodiments, the area of the first area is greater than the combined area of the second and third areas. The second configuration can be one of a configuration in which the first sub-support is folded to the main support so as to expose a first partial area of the first area and the third area; and a configuration in which the second sub-support is folded to the main support so as to expose a second partial area of the first area and the second area. The first and second partial areas can overlap so as to form a third partial area. The third configuration can be a configuration in which the third partial area is exposed.

In exemplary embodiments, the flexible display further comprises a sensor configured to: i) sense which of the first to third configurations in which the flexible display panel is arranged and ii) output the sensed configuration; and a display controller configured to activate the first to third areas of the flexible display panel according to the sensed configuration of the flexible display panel. The sensor can comprise at least one of: a pressure sensor, an illumination sensor, a proximity sensor, an acceleration sensor, an angular velocity sensor, a gyro sensor, a strain gauge sensor, and a gravity sensor. The display controller can be further configured to activate the area of the flexible display panel that is exposed according to the configuration of the flexible display panel.

In exemplary embodiments, the display controller is further configured to activate: the first partial area and the third area when the sensor detects that the flexible display panel is in the second configuration in which the first sub support is folded; and the second partial area and the second area when the sensor detects that the flexible display panel is in the second configuration in which the second sub support is folded. The display controller can be further configured to: activate the first to third areas when the sensor detects that the flexible display panel is in the first configuration; and activate the third partial area when the sensor detects that the flexible display panel is in the third configuration.

In exemplary embodiments, the flexible display further comprises a power supply configured to supply power to the flexible display panel. The power supply can be arranged on the first or second sub-support. The main support can comprise a printed circuit board. The flexible display can further comprise a microphone configured to receive input audio and a speaker configured to output audio. The microphone can be arranged on the first sub-support and wherein the speaker is arranged on the second sub-support.

Another aspect is a flexible display comprising a flexible display panel; a main support supporting a first area of the flexible display panel; a sub-support supporting a second area of the flexible display panel, wherein the second area is adjacent to the first area; a transparent cover covering a portion of the first area so as to expose the portion; and a hinge connecting the main support to the sub-support, wherein the flexible display is configured to be arranged in first and second configurations, wherein the first configuration is a configuration in which the sub-support is unfolded from the main support so as to expose the first and second areas, wherein the second configuration is a configuration in which the sub-support is folded to the main support so as to expose only a portion of the first area.

BRIEF DESCRIPTION OF THE DRAWINGS

The accompanying drawings are included to provide a further understanding of the described technology and are incorporated in and constitute a part of this specification. The drawings illustrate exemplary embodiments of the described technology and, together with the description, serve to explain principles of the described technology. In the drawings:

FIG. 5A is a front view of the flexible display including a voice input unit and a voice output unit according to an embodiment.

DETAILED DESCRIPTION OF CERTAIN INVENTIVE EMBODIMENTS

General terms widely currently used have been selected in the present disclosure in consideration of the functions of the described technology and they may be changed according to the intention of one skilled in the art, customs, appearance of new technology, and the like. The terms used herein may be defined by the applicant. In this specification, since the meaning of such terms are described in detail in the detailed description of the specification, the described technology should be understood based on the defined meanings of such terms and in consideration of overall disclosure of the specification, and not based on the ordinary meaning of such terms.

Hereinafter, specific embodiments will be described in detail with reference to the accompanying drawings. The present disclosure may, however, be embodied in different forms and should not be construed as limited to the embodiments set forth herein.

An embodiment relates to a flexible display including a flexible display panel. In some embodiments, the flexible display is a display that maintains display features when the physical features of the display, such as its configuration, size, and length, are changed. Also, the flexible display can be included in various electronic devices including the flexible display.

Figure 1A:
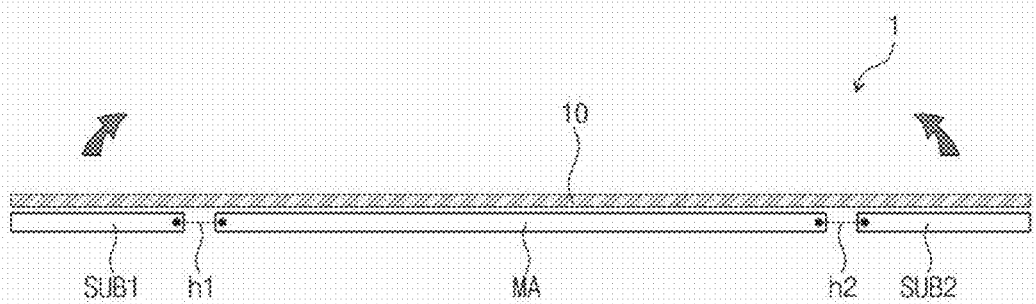
FIGS. 1A, 2A, and 3A are side views of a flexible display according to an embodiment.
Figure 1B:
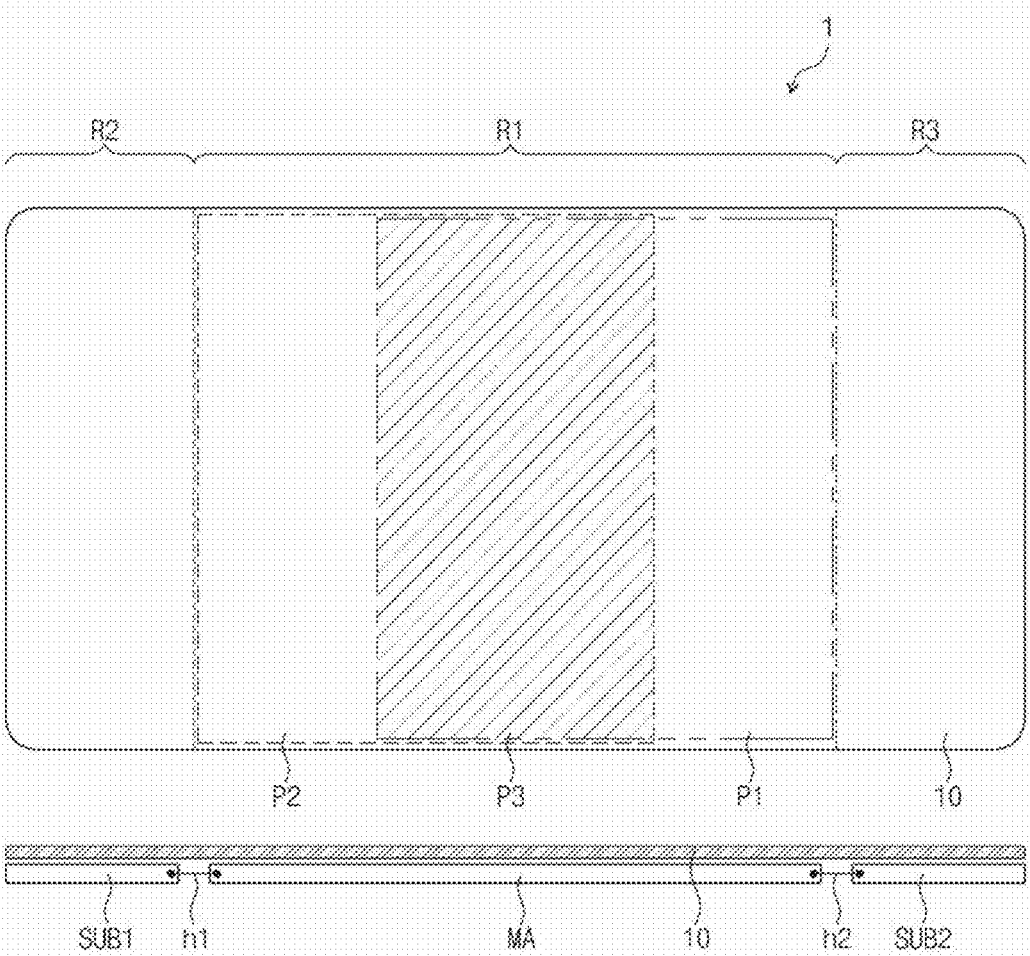
FIGS. 1B, 2B, and 3B are front and side views of the flexible display according to an embodiment.
Figure 2A:
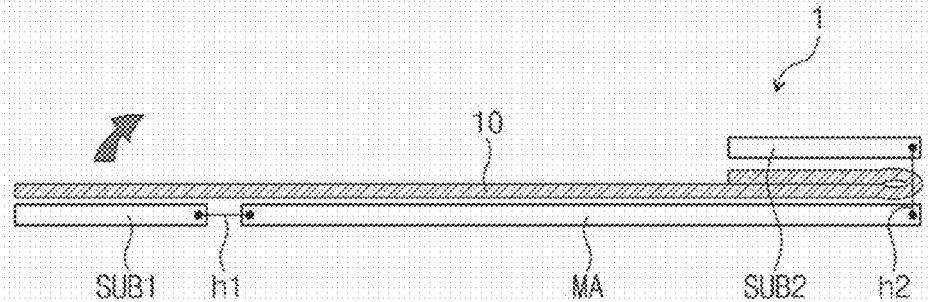
Figure 2B:
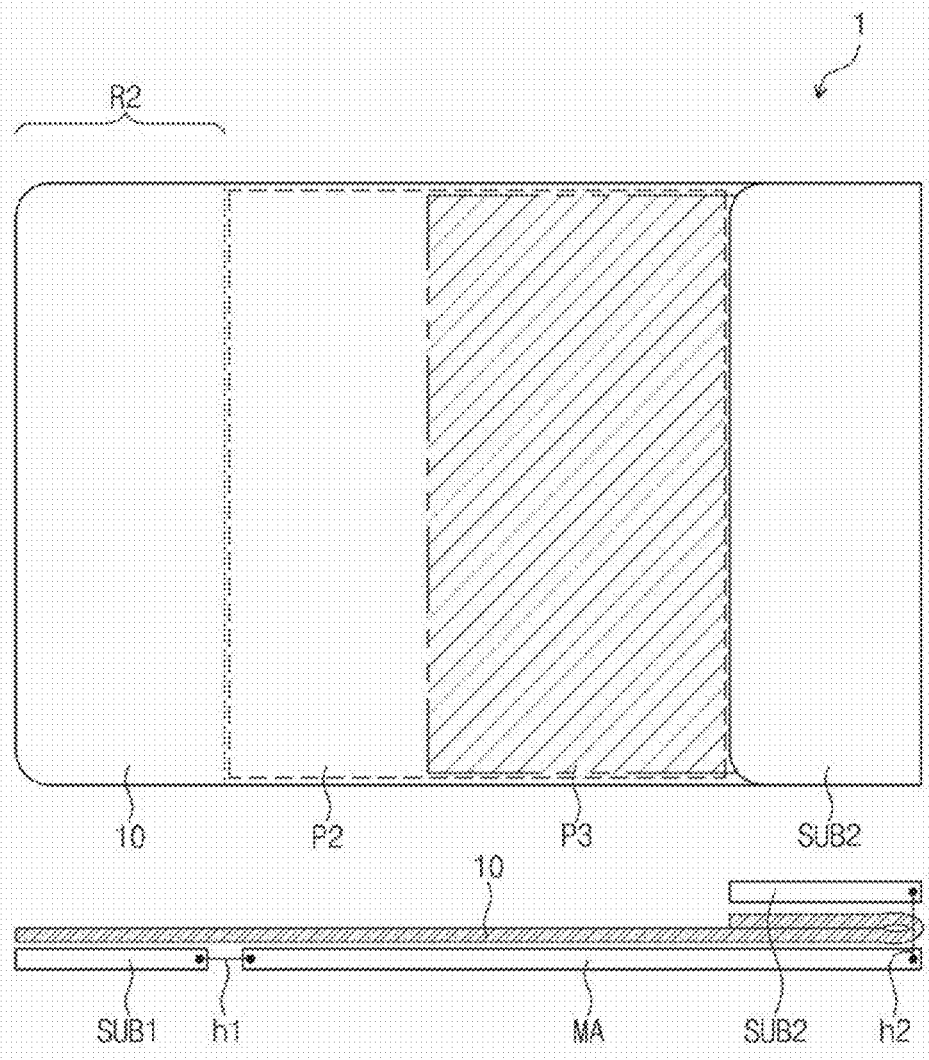
Figure 3A:
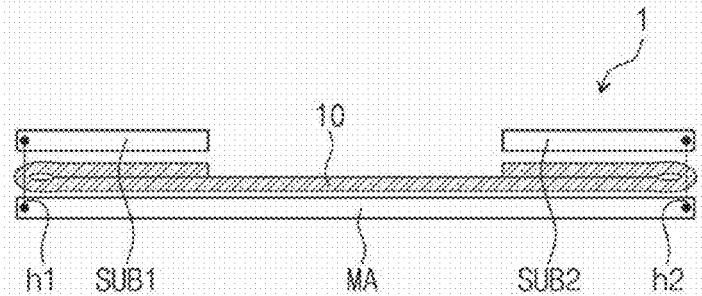
Figure 3B:
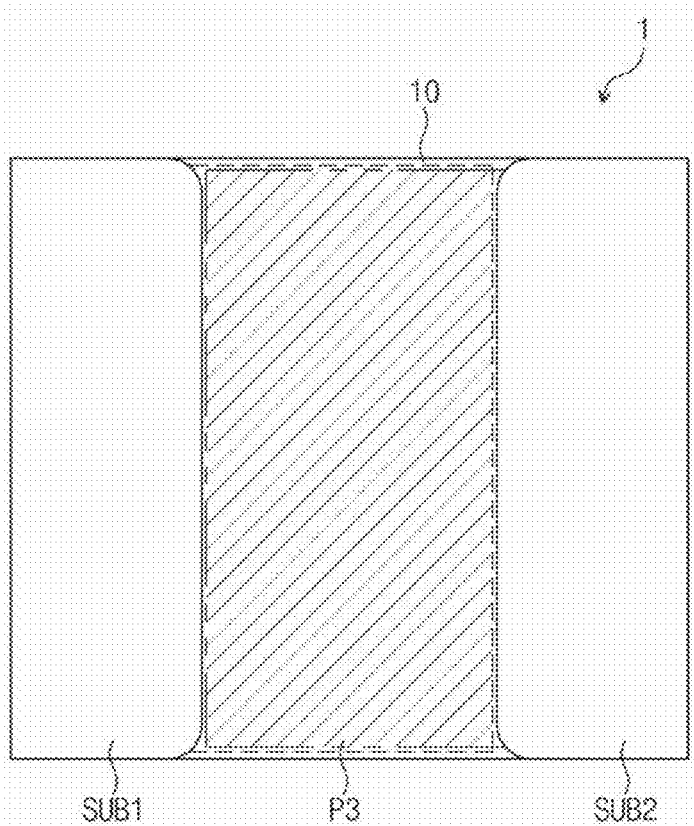
Figure 3B:
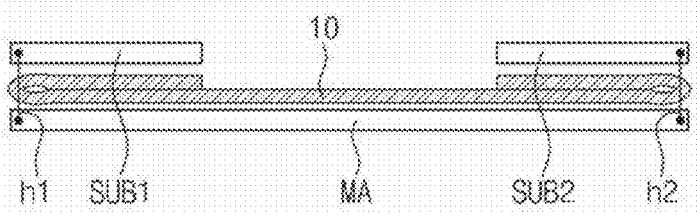

FIGS. 1A, 2A, and 3A are side views of the flexible display and FIGS. 1B, 2B, and 3B are front and side views of the flexible display.

Referring to FIGS. 1A to 3B, a flexible display 1 includes a main support MA supporting the flexible display panel 10 and first and second sub-supports SUB1 and SUB2. The main support MA and the first and second sub-supports SUB1 and SUB2 support the flexible display panel 10 to maintain the flexible display panel 10 in a specific configuration. The main support MA and the first and second sub-supports SUB1 and SUB2 may include various substrates formed of a rigid material, a flexible material, and/or an elastic material.

The main support MA supports a first area R1 of the flexible display panel 10 and the first and second sub-supports SUB1 and SUB2 respectively support second and third areas R2 and R3 of the flexible display panel 10. The second and third areas R2 and R3 represent areas that are adjacent to opposing sides of the first area R1.

The total area of the first and second sub-supports SUB1 and SUB2 can be smaller than the area of the main support MA. Accordingly, the total area of the second and third areas R2 and R3 respectively corresponding to the first and second sub-supports SUB1 and SUB2 can be smaller than the area of the first area R1 corresponding to the main support MA.

The main support MA and the first and second sub-supports SUB1 and SUB2 are connected to each other via hinge parts or hinges h1 and h2. For example, the main support MA is connected to the first sub-support SUB1 through the first hinge part h1 and is connected to the second sub-support SUB2 through the second hinge part h2. The first and second sub-supports SUB1 and SUB2 can be folded onto or unfolded from the main support MA via the hinge parts h1 and h2.

The hinge parts h1 and h2 enable the first and second sub-supports SUB1 and SUB2 to be folded to or unfolded in a predetermined manner or to allow the first and second sub-supports SUB1 and SUB2 and the main support MA to be maintained at a predetermined folding angle.

The second and third areas R2 and R3 of the flexible display panel 10 can be exposed to or shielded from the environment depending on whether the first and second sub-supports SUB1 and SUB2 are folded or unfolded. The first area R1 of the flexible display panel 10 can be partially exposed or shielded depending on whether the first and second sub-supports SUB1 and SUB2 are folded. However, since each of the first and second sub-supports SUB1 and SUB2 has an area that is less than that of the main support MA, a specific area P3 of the first area R1 is always exposed to the environment regardless of whether the first and second sub-supports SUB1 and SUB2 are folded. Detailed descriptions with respect to the exposure of each of the areas R1 to R3 of the flexible display panel 10 will be described later in detail with reference to each of configurations of the flexible display panel 10.

The flexible display panel 10 can have first to third configurations depending on whether the first and second sub-supports SUB1 and SUB2 are folded to or unfolded from the main support MA.

Referring to FIGS. 1A and 1B, the flexible display panel 10 can have a first configuration in which the first to third areas R1 to R3 are exposed to the environment as the first and second sub-supports SUB1 and SUB2 are unfolded from the main support MA. When a user intends to use a large display screen, the configuration of the flexible display panel 10 can be deformed to the first configuration. For example, when the user intends to watch a movie, the flexible display panel 10 can be deformed to the first configuration.

Referring to FIGS. 2A and 2B, the flexible display panel 10 can have a second configuration in which a portion of the first area R1 and the second or third areas R2 or R3 are exposed to the environment as the first or second sub-supports SUB1 and SUB2 are folded to the main support MA.

In more detail, the second configuration is a configuration of the flexible display panel 10 in which a first partial area P1, which is a part of the first area R1, and the third area R3 are exposed to the environment when the first sub-support SUB1 is folded to the main support MA. Alternatively, the second configuration is a configuration of the flexible display panel 10 in which a second partial area P2, which is a portion of the first area R1, and the second area R2 are exposed to the environment when the second sub-support SUB2 is folded to the main support MA.

The first and second partial areas P1 and P2 can share a third sub area P3. The third partial area P3 is always exposed regardless of whether the first and second sub-supports SUB1 and SUB2 are folded. This will be described later with reference to FIGS. 3A and 3B.

When a user intends to use a medium-sized display screen, the configuration of the flexible display panel 10 can be deformed to the second configuration. For example, when the user intends to write a text message, the flexible display panel 10 can be deformed to the second configuration.

Referring to FIGS. 3A and 3B, the flexible display panel 10 can have a third configuration in which a portion of the first area R1 is exposed to the environment as the first and second sub-supports SUB1 and SUB2 are folded to the main support MA. Specifically, the third configuration is a configuration of the flexible display panel 10 in which the third partial area P3 of the first area R1 is exposed to the environment.

As described above, the third partial area P3 is formed by a difference in area between the main support MA and the first and second sub-supports SUB1 and SUB2. Accordingly, the third sub partial P3 can represent a specific area of the first area R1, which is always exposed to the environment regardless of whether the first and second sub-supports SUB1 and SUB2 are folded.

Since the third partial area P3 is always exposed to the environment, a quick-view display function for rapidly providing simple information to the user can be provided. For example, the flexible display panel 10 with the third configuration can rapidly and simply provide feedback information of a received call, a received message, and/or an alarm via the third partial area P3. Accordingly, the user can rapidly receive various information through the third partial area P3 even when the first and second sub-supports SUB1 and SUB2 are folded to the main support MA.

As described above, since the flexible display panel 10 can be deformed in different configurations according to its use, the flexible display 1 can have an improved portability and usability. Also, the supports MA, SUB1, and SUB2 supporting the flexible display panel 10 are provided to prevent the flexible display panel 10 from being damaged by external impact.

Figure 4:
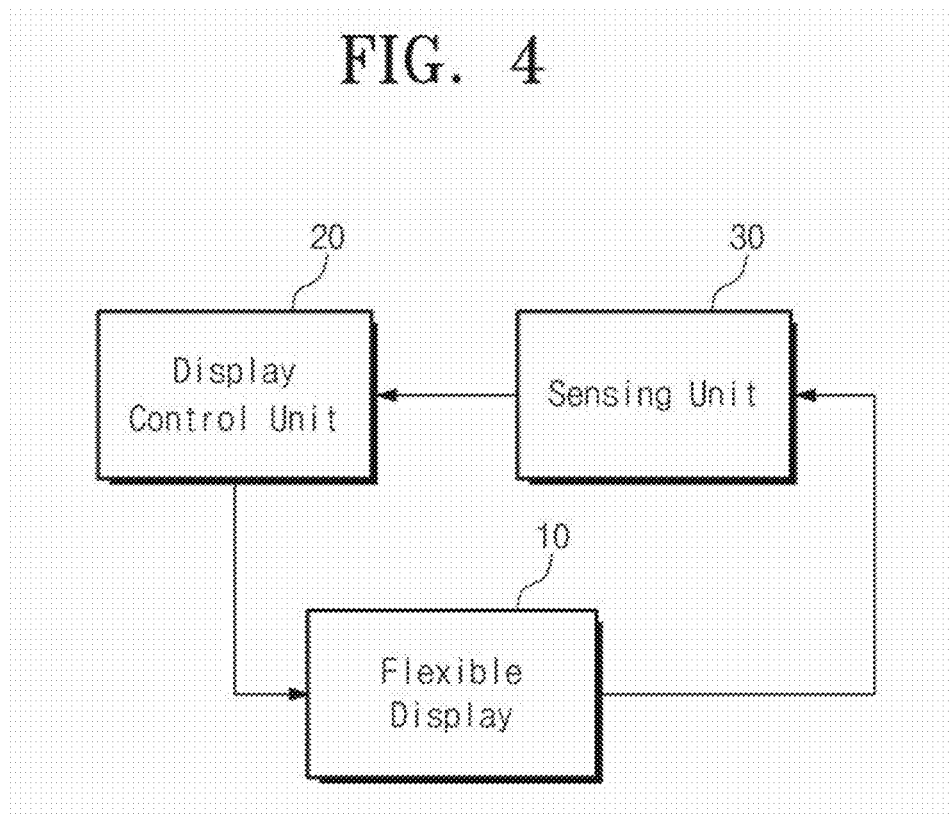
FIG. 4 is a block diagram of components related to the operation of the flexible display according to an embodiment.

FIG. 4 is a block diagram of the components related to the operation of the flexible display. The flexible display 1 includes a sensing unit or sensor 30 for sensing the configuration of the flexible display panel 10 and a display control unit or display controller 20 for controlling the operations of the flexible display panel 10 based on the sensed configuration of the flexible display panel 10.

The sensing unit 30 can sense the configuration of the flexible display panel 10. Specifically, the sensing unit 30 can sense the first to third configurations of the flexible display panel 10. The sensing unit 30 can include at least one sensor which can sense the configuration of the flexible display panel 10.

For example, the sensing unit can include at least one of a pressure sensor, an illumination sensor, a proximity sensor, an acceleration sensor, an angular velocity sensor, a gyro sensor, a strain gauge sensor, or a gravity sensor. The above-mentioned sensors can be included in the flexible display 1 as a separate element or can be integrated to an at least one element of the flexible display 1.

The sensing unit 30 can be arranged at various locations of the flexible display 1 according to a kind of the sensors included therein. For example, when the sensing unit 30 senses the configuration of the flexible display panel 10 by using the illumination sensor, the sensing unit 30 can be arranged on each of the first to third areas R1 to R3 of the flexible display panel 10. Alternatively, when the sensing unit 30 senses the configuration of the flexible display panel 10 by using the pressure sensor, the sensing unit 30 can be arranged on the hinge parts h1 and h2 of the flexible display 1.

The sensing unit 30 can transmit the result obtained by sensing the configuration of the flexible display panel 10 to the display control unit 20.

The display control unit 20 can detect the configuration of the flexible display panel 10 through the sensed results transmitted from the sensing unit 30 to control activation of the display according to the detected configuration of the flexible display panel 10.

The display control unit 20 selectively activates an area exposed to the outside according to the configuration of the flexible display panel 10. For example, the display control unit 20 can activate the first to third areas R1 to R3 when the first configuration of the flexible display panel 10 is detected. The display control unit 20 can activate the first partial area P1 and the third area R3 when the second configuration in which the first sub-support SUB1 is folded to the main support MA is detected. The display control unit 20 can activate the second partial area P2 and the second area R2 when the second configuration in which the second sub-support SUB2 is folded to the main support MA is detected. The display control unit 20 can further activate the third partial area P3 when the third configuration is detected.

The display control unit 20 can reduce unnecessary power consumption because only a portion of the area of the flexible display which is exposed to the environment is selectively activated according to the configuration deformation of the flexible display panel 10.

Figure 5B:
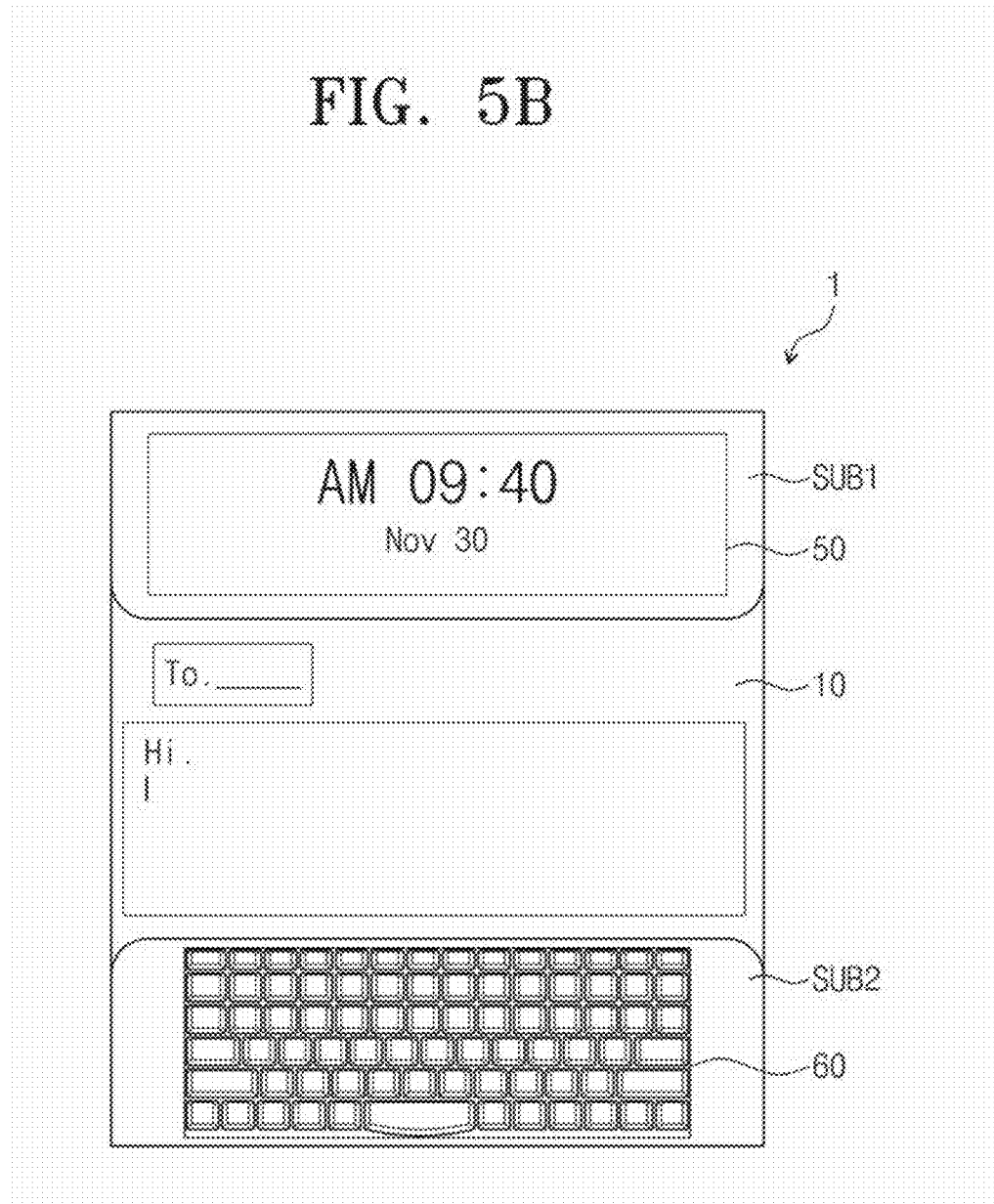
FIG. 5B is a front view of the flexible display including a sub display unit and a key input unit according to an embodiment.

FIG. 5A is a front view of the flexible display including a voice input unit and a voice output unit. FIG. 5B is a front view of the flexible display including a sub display unit and a key input unit.

Referring to FIG. 5A, the flexible display 1 may include a voice input unit 41 and a voice output unit 40. The voice input unit 41 is a component that can receive audio, such as a voice, as input and the voice output unit 40 is a component that can output audio, such as a voice. In one embodiment, the voice input unit 41 is a microphone and the voice output unit 40 is a speaker. The voice output unit 40 can be arranged on the first support SUB1 and the voice input unit 41 can be arranged on the second sub-support SUB2. Accordingly, a user can make a call by using the flexible display 1 having the third configuration.

Referring to FIG. 5B, the flexible display 1 includes a sub display unit 50 and a key input unit 60. The sub display unit 50 can include a substrate formed of a rigid material and be arranged on the first sub-support SUB1. Also, the sub display unit 50 can include a light-emitting diode (LED). The sub display unit 50 can provide a quick-view display instead of or together with the third partial area P3.

In some embodiments, the key input unit 60 is an input unit, such as a keyboard, that can receive input characters and is arranged on the second sub-support SUB2. The user can fold the flexible display panel 10 to the second configuration in which the second sub-support SUB2 is folded to the main support MA or to the third configuration to utilize the key input unit 60.

Although not illustrated in the drawings, the flexible display 1 can include a power supply unit or power supply and a printed circuit board (PCB). The power supply unit can supply power to the flexible display 1. The PCB may be a substrate including various driving circuits for driving the flexible display panel 10.

The PCB can be arranged on the main support MA and the power supply unit can be arranged on the first support SUB1 and/or the second sub-support SUB2. Since the PCB and the power supply unit are separate from each other and arranged on the flexible display 1, the printed circuit board can be prevented from being damaged due to heat generated from the power supply unit.

That is, the flexible display 1 can include various function units or components for performing various functions according to the display's purpose of use, its manufacturing method, and the like. The components can be formed on sides of the main support MA and the first and second sub-supports SUB1 and SUB2.

Figure 6:
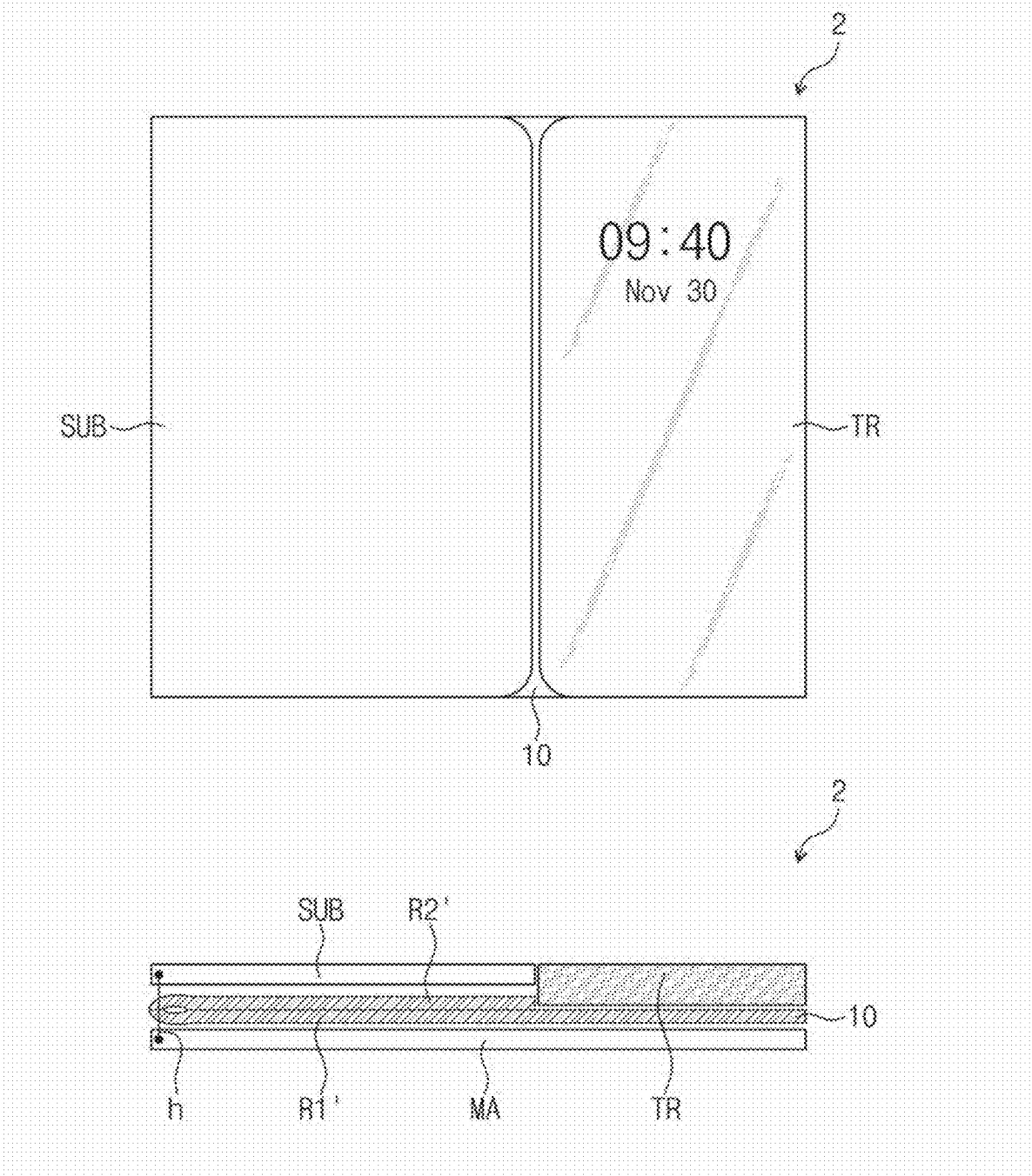
FIG. 6 illustrates front and side views of the flexible display including a transparent cover according to an embodiment.

FIG. 6 is a side and front view of the flexible display including a transparent cover. The details described with reference to FIGS. 1A to 5B may be similarly applied to a flexible display 2, and thus duplicated description will be omitted.

Referring to FIG. 6, the flexible display 2 includes a main support MA supporting a flexible display panel 10 and a sub-support SUB. The main support MA supports a first area R1' of the flexible display panel 10. The sub-support SUB supports a second area R2' of the flexible display panel 10 adjacent to the first area R1'. Also, the flexible display 2 includes a transparent cover TR covering a portion of the first area R1'. Each of the sub-support SUB and the transparent cover TR are substantially the same as that of the main support MA of FIGS. 1A to 5B.

Since the transparent cover TR includes a substrate formed of a transparent material, a portion of the first area R1', covered by the transparent cover part TR, is always exposed to the environment. Accordingly, the area covered by the transparent cover TR enables a quick-view display function. The transparent cover TR can prevent the area of the first area R1' from being damaged.

The main support MA and the sub-support SUB are connected to each other through a hinge part h. Accordingly, the sub-support SUB can be folded to or unfolded from the main support MA via the hinge part h. The flexible display panel 10 can be folded to the first or second configuration depending on whether the sub-support SUB is folded to the main support MA. Furthermore, the first and second areas R1' and R2' supported by the sub-support SUB and the main support MA can be exposed or shielded according to whether the sub-support SUB is folded to the main support MA.

The first configuration is a configuration in which the sub-support SUB is unfolded from the main support MA to expose the first and second areas R1' and R2' to the environment. The second configuration is a configuration in which the sub-support SUB is folded to the main support MA to expose only a portion of the first area R1' which is covered by the transparent cover part TR to the environment. A user may variously fold or unfold the configuration of the flexible display panel 10 according to the user's desired purpose for using the flexible display 2.

Although not illustrated in the drawings, the flexible display 2 can also include a sensing unit 30 and a display control unit 20. Accordingly, the display control unit 20 can detect the configuration of the flexible display to selectively activate the area of the flexible display panel 10 that is exposed to the environment. For example, the display control unit 20 can detect the first configuration of the flexible display panel 10 to activate the first and second areas R1' and R2'. Also, the display control unit 20 can detect the second configuration of the flexible display panel 10 to activate only a portion of the first area R1' which is covered by the transparent cover part TR. In the second configuration, the display control unit 20 deactivates the first and second areas except for the portion of the first area R1'. Accordingly, the display control unit 20 can reduce unnecessary power consumption of the flexible display 20.

The drawings are separately described for convenience of description, but it is possible that a new embodiment can be implemented by combining the embodiments illustrated in each of the drawings. Also, the flexible display 1 and 2 can be embodied in different forms and should not be construed as limited to the embodiments set forth herein. Various combinations of all or a portion of each embodiment may be possible.

The flexible display according to at least one embodiment can prevent the flexible display from being damaged.

Although embodiments of the inventive technology have been disclosed, the described technology should not be construed as limited to the embodiments set force herein, various changes and modifications may be made thereto by one skilled in the art without departing from the scope and spirit of the invention as set forth in the appended claims. The modifications should not be considered separately from the inventive technology.

What is claimed is:

1. A flexible display, comprising:
a flexible display panel;
a main support supporting a first area of the flexible display panel;
first and second sub-supports respectively supporting second and third areas of the flexible display panel, wherein the second and third areas are adjacent to the first area;
first and second hinges respectively connecting the main support to the first and second sub-supports; and
a display controller configured to activate the first to third areas of the flexible display panel,
wherein the flexible display panel is configured to be arranged in first to third configurations,
wherein the first configuration is a configuration in which the first and second sub-supports are unfolded from the main support so as to expose the first to third areas,
wherein the second configuration is a configuration in which one of the first or second sub-support is folded to the main support,
wherein the second configuration is one of: i) a configuration in which the first sub-support is folded to the main support so as to expose a first partial area of the first area and the third area and ii) a configuration in which the second sub-support is folded to the main support so as to expose a second partial area of the first area and the second area,
wherein the third configuration is a configuration in which the first and second sub-supports are folded to the main support so as to i) expose a third partial area of the first area and ii) shield a fourth portion of the first area,
wherein the first and second partial areas overlap so as to form a third partial area, and
wherein the display controller is further configured to: i) activate the exposed portions of the first area when the flexible display panel is arranged in the second and third configurations and ii) deactivate the shielded portions of the first area when the flexible display panel is arranged in the second and third configurations.

2. The flexible display of claim 1, wherein the area of the first area is greater than the combined area of the second and third areas.

3. The flexible display of claim 1, further comprising:
a sensor configured to: sense which of the first to third configurations in which the flexible display panel is arranged and output the sensed configuration,
wherein the display controller is further configured to activate the first to third areas of the flexible display panel according to the sensed configuration of the flexible display panel.

4. The flexible display of claim 3, wherein the sensor comprises at least one of: a pressure sensor, an illumination sensor, a proximity sensor, an acceleration sensor, an angular velocity sensor, a gyro sensor, a strain gauge sensor, and a gravity sensor.

5. The flexible display of claim 3, wherein the display controller is further configured to activate the area of the flexible display panel that is exposed according to the configuration of the flexible display panel.

6. The flexible display of claim 5, wherein the display controller is further configured to activate:
the first partial area and the third area when the sensor detects that the flexible display panel is in the second configuration in which the first sub support is folded; and
the second partial area and the second area when the sensor detects that the flexible display panel is in the second configuration in which the second sub support is folded.

7. The flexible display of claim 6, wherein the display controller is further configured to:
activate the first to third areas when the sensor detects that the flexible display panel is in the first configuration; and
activate the third partial area when the sensor detects that the flexible display panel is in the third configuration.

8. The flexible display of claim 7, further comprising a power supply configured to supply power to the flexible display panel.

9. The flexible display of claim 8, wherein the power supply is arranged on the first or second sub-support.

10. The flexible display of claim 9, wherein the main support comprises a printed circuit board.

11. The flexible display of claim 7, further comprising:
a microphone configured to receive input audio; and
a speaker configured to output audio.

12. The flexible display of claim 11, wherein the microphone is arranged on the first sub-support and wherein the speaker is arranged on the second sub-support.

13. A flexible display comprising:
a flexible display panel;
a main support supporting a first area of the flexible display panel;
a sub-support supporting a second area of the flexible display panel, wherein the second area is adjacent to the first area and wherein each of the first and second areas is configured to display images;
a transparent cover covering a portion of the first area so as to expose the portion of the first area;
a hinge connecting the main support to the sub-support, a display controller configured to activate the first and second areas of the flexible display panel wherein the flexible display is configured to be arranged in first and second configurations, wherein the first configuration is a configuration in which the sub-support is unfolded from the main support so as to expose the first and second areas, wherein the second configuration is a configuration in which the sub-support is folded to the main support so as to expose only the portion of the first area covered by the transparent cover and shield the rest of the first area, and wherein the display controller is further configured to activate the exposed portions of the first area and deactivate the shielded portions of the first area when the flexible display panel is arranged in the second configuration.

14. A flexible display comprising:

a flexible display panel;

a main support supporting a first area of the flexible display panel;

first and second sub-supports respectively supporting second and third areas of the flexible display panel, wherein the second and third areas are adjacent to the first area;

first and second hinges respectively connecting the main support to the first and second sub-supports; and a display controller configured to activate the first to third areas of the flexible display panel, wherein the flexible display panel is configured to be arranged in first to third configurations, wherein the first configuration is a configuration in which the first and second sub-supports are unfolded from the main support so as to expose the first to third areas, wherein the second configuration is a configuration in which one of the first or second sub-support is folded to the main support so as to expose a portion of the first area and one of the second or third areas and partially shield the first area, wherein the third configuration is a configuration in which the first and second sub-supports are folded to the main support so as to expose the portion of the first area and partially shield the first area, and wherein the display controller is further configured to: i) activate the exposed portions of the first area when the flexible display panel is arranged in the second and third configurations and ii) deactivate shielded portions of the first area when the flexible display panel is arranged in the second and third configurations.

* * * * *